(12) United States Patent  
Son et al.

(10) Patent No.: US 8,482,597 B2  
(45) Date of Patent: Jul. 9, 2013

(54) STEREOSCOPIC IMAGE DISPLAY DEVICE (75) Inventors: Jungeun Son, Seoul (KR); Heejin Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 384 days.

(21) Appl. No.: 12/890,000

(22) Filed: Sep. 24, 2010

(65) Prior Publication Data

US 2011/0084961 A1    Apr. 14, 2011

(30) Foreign Application Priority Data

Oct. 9, 2009   (KR) .................. 10-2009-0096135

(51) Int. Cl.
*H04N 13/04* (2006.01)
*H04N 13/00* (2006.01)
*H04N 15/00* (2006.01)
*G02F 1/1335* (2006.01)

(52) U.S. Cl.
USPC .............................. 348/42; 348/59; 349/117

(58) Field of Classification Search
USPC .................. 348/42–60; 345/58; 349/117–129
See application file for complete search history.

(56) References Cited

U.S. PATENT DOCUMENTS

| 7,206,048 B2 * | 4/2007 | Song ........................... 349/129 |
| 2007/0296896 A1 | 12/2007 | Hong et al. |
| 2009/0015737 A1 | 1/2009 | Jung et al. |
| 2009/0153653 A1 * | 6/2009 | Lee et al. ....................... 348/59 |
| 2009/0190049 A1 | 7/2009 | Hong et al. |
| 2010/0245743 A1 * | 9/2010 | Yokoyama ................. 349/117 |

FOREIGN PATENT DOCUMENTS

| JP | 2007315661 | * 12/2007 |
| WO | 2007/072241 A1 | 6/2007 |
| WO | 2007/072289 A2 | 6/2007 |

* cited by examiner

*Primary Examiner* — Sath V Perungavoor  
*Assistant Examiner* — Howard D Brown, Jr.  
(74) *Attorney, Agent, or Firm* — Morgan, Lewis & Bockius LLP

(57) ABSTRACT

A stereoscopic image display device comprises a display panel, and a lens panel disposed on one surface of the display panel, wherein the lens panel includes, a lower substrate, a lower electrode layer having electrodes divided in plurality on one surface of the lower substrate, a liquid crystal layer disposed on the lower electrode layer and tilted in a lens form, an upper substrate combined to the lower substrate, and an upper electrode layer disposed on one surface of the upper substrate and having pattern omissions where a part of electrodes is omitted in areas corresponding to a surface of discontinuity of the lens form.

12 Claims, 6 Drawing Sheets

STEREOSCOPIC IMAGE DISPLAY DEVICE

This application claims the priority and the benefit of Korean Patent Application No. 10-2009-0096135 filed on Oct. 9, 2009, the entire contents of which is incorporated herein by reference for all purposes as if fully set forth herein.

BACKGROUND

1. Field

This document relates to a stereoscopic image display device

2. Related Art

Stereoscopic image display devices are generally classified into display devices of employing a stereoscopic technique and display devices of employing an autostereoscopic technique.

The stereoscopic technique uses binocular parallax images which are great in the stereoscopic effect. The stereoscopic technique has a type of using glasses and a type of not using glasses, and, at present, the two types have been put to practical use. In the type of using glasses, binocular parallax images are displayed on a direct view display panel or a projector by changing polarization directions or in the temporal division manner, and polarization glasses or liquid crystal shutter glasses are used to implement stereoscopic images. In the type of not using glasses, the stereoscopic images are implemented by dividing optical axes of binocular parallax images, such as a parallax barrier scheme, a lenticular lens scheme or the like.

In the parallax barrier scheme, images, which are respectively viewed by the left and right eyes, are alternately printed or photographed to have longitudinal patterns, and then are viewed through extremely thin longitudinal lattice lines, that is, a barrier. In this way, the longitudinal images for the left eye and the longitudinal images for the right eye are assigned by the barrier, and this causes each of the left and right eyes to view images of viewpoints different from each other, thereby viewing stereoscopic images. On the other hand, in the lenticular scheme, when images corresponding to the left and right eyes are respectively disposed at a focus plane of a lenticular lens and are viewed through the lenticular lens, the images are divided into images for the left eye and images for the right eye to form stereoscopic images. Meanwhile, in a case of a stereoscopic image display device including a liquid crystal layer which is tilted in a Fresnel lens form by the electric field in the lenticular scheme, there is a problem in that it is difficult to realize an ideal lens due to a small pitch of the lens, and thus it is required to solve the problem.

SUMMARY

According to an exemplary embodiment of this document, there is a stereoscopic image display device comprising a display panel, and a lens panel disposed on one surface of the display panel, wherein the lens panel includes, a lower substrate, a lower electrode layer having electrodes divided in plurality on one surface of the lower substrate, a liquid crystal layer disposed on the lower electrode layer and tilted in a lens form, an upper substrate combined to the lower substrate, and an upper electrode layer disposed on one surface of the upper substrate and having pattern omissions where a part of electrodes is omitted in areas corresponding to a surface of discontinuity of the lens form.

According to another exemplary embodiment of this document, there is provided a stereoscopic image display device comprising a display panel, and a lens panel disposed on one surface of the display panel, wherein the lens panel includes a lower substrate, a first lower electrode layer having an electrode which is divided in plurality on one surface of the lower substrate, a second lower electrode layer having an electrode which is divided in plurality on the first electrode layer, an upper substrate combined to the lower substrate, an upper electrode layer placed on one surface of the upper substrate and having at least two pattern omissions where a part of electrodes are omitted, and a liquid crystal layer tilted in a lens form by electric fields generated between the first and second lower electrode layers and the upper electrode layer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Detailed contents for practicing this document will now be described with reference to the accompanying drawings.

Figure 1:
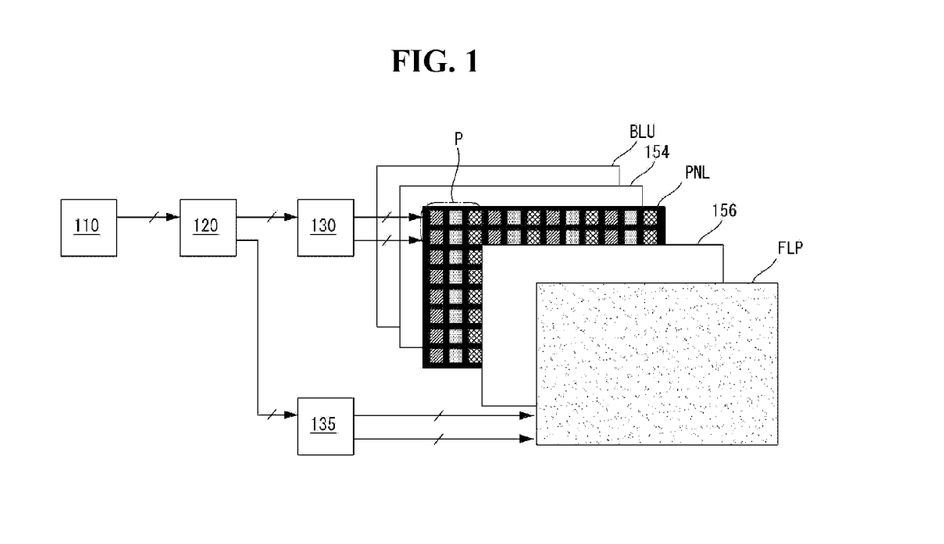
FIG. 1 is a schematic configuration diagram of a stereoscopic image display device according to an embodiment of this document.
Figure 2:
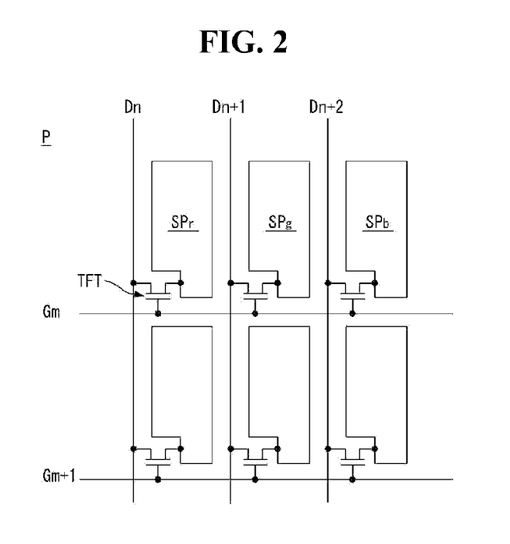
FIG. 2 is a configuration diagram of subpixels of the display panel shown in FIG. 1.

FIG. 1 is a schematic configuration diagram of a stereoscopic image display device according to an embodiment of this document, and FIG. 2 is a configuration diagram of subpixels of the display panel shown in FIG. 1.

As shown in FIGS. 1 and 2, a stereoscopic image display device according to an embodiment of this document comprises an image supply unit 110, a controller 120, a first driver 130, a second driver 135, a display panel PNL, and a lens panel FLP.

The image supply unit 110 supplies image frame data to the controller 120. The image supply unit 110 also supplies to the controller 120 timing signals such as a vertical synchronization signal Vsync, a horizontal synchronization signal Hsync, a data enable signal DE, a main clock, a low potential voltage GND, and so forth.

The controller 120 converts a frame frequency of the image frame data from the image supply unit 110 into a frame frequency of 60×n (where n is a positive integer of two or more) Hz, for example, a frame frequency of 120 Hz, for supply to the first driver 130. The controller 120 multiplies the frame frequency of input images by n, thereby increasing frequencies of timing control signals for controlling operation timings of the first and second drivers 130 and 135.

The first driver 130 includes a data driving circuit connected to data lines Dn to Dn+2, and a gate driving circuit connected to gate lines Gm and Gm+1. Under the control of the controller 120, the first driver 130 converts the digital image frame data from the controller 120 into analog image frame data with positive and negative polarities so as to be supplied to the data lines Dn to Dn+2. The first driver 130 sequentially supplies scan pluses (or gate pulses) to the gate lines Gm and Gm+1 under the control of the controller 120.

The second driver 135 controls the lens panel FLP under the control of the controller 120. The second driver 135 supplies voltages with a predetermined voltage difference to the lens panel FLP such that a liquid crystal layer included in the lens panel FLP is tilted in a lens form.

The display panel PNL may be implemented by any one of a liquid crystal display panel, an organic light emitting diode display, and a plasma display panel, and in this embodiment, the liquid crystal display panel will be described as an example. The display panel PNL which is the liquid crystal display panel comprises a thin film transistor ("TFT") substrate and a color filter substrate. A liquid crystal layer is disposed between the TFT substrate and the color filter substrate. The data lines Dn to Dn+2 and the gate lines Gm and Gm+1 are formed to intersect each other on the TFT substrate, and subpixels Spr, SPg and Spb, which are respectively defined by the data lines Dn to Dn+2 and the gate lines Gm and Gm+1, are arranged in a matrix. TFTs formed at the respective intersections of the data lines Dn to Dn+2 and the gate lines Gm and Gm+1 transmit, to pixel electrodes of liquid cells, data voltages transmitted via the data lines Dn to Dn+2, in response to the scan pulses from the gate lines Gm and Gm+2. For this, gate electrodes of the TFTs are connected to the gate lines Gm and Gm+1, and source electrodes thereof are connected to the data lines Dn to Dn+2. Drain electrodes of the TFTs are connected to the pixel electrodes of the liquid crystal cells. Common electrodes opposite to the pixel electrodes are applied with common voltages. The color filter substrate is provided with black matrices and color filters. The common electrodes are formed on the color filter substrate in a vertical filed driving type such as a twisted nematic (TN) mode and a vertical alignment (VA) mode, and they are formed on the TFT substrate along with the pixel electrodes in a horizontal field driving type such as an in plane switching (IPS) mode and a fringe field switching (FFS) mode. Polarizers 154 and 156 are respectively attached to the outer surfaces of the color filter substrate and the TFT substrate of the display panel PNL. Spacers used to maintain a cell gap of the liquid crystal layer are disposed between the color filter substrate and the TFT substrate of the display panel PNL. A liquid crystal mode for the display panel PNL may be implemented by any other liquid crystal mode as well as the TN mode, the VA mode, the IPS mode, and the FFS mode. A light provided from a backlight unit BLU is linearly polarized or circularly polarized in the display panel PNL for emission.

The lens panel FLP is attached to a display surface of the display panel PNL. The lens panel includes the liquid crystal layer which is tilted in a Fresnel lens form under the control of the second driver 135 so that images displayed on the display panel PNL are divided into a field of the left eye and a field of the right eye. The liquid crystal layer included in the lens panel FLP may be implemented by liquid crystal molecules driven by the vertical field driving scheme, for example, not limited to, liquid crystal molecules driven in an electrically controlled birefringence (ECB) mode.

The structure of the liquid crystal display panel will be described more in detail. The stereoscopic image display device according to an embodiment of this document is applicable to various kinds of display panels, and, for convenience of the description, a liquid crystal display panel in accordance with the vertical field driving scheme will be described as an example.

Figure 3:
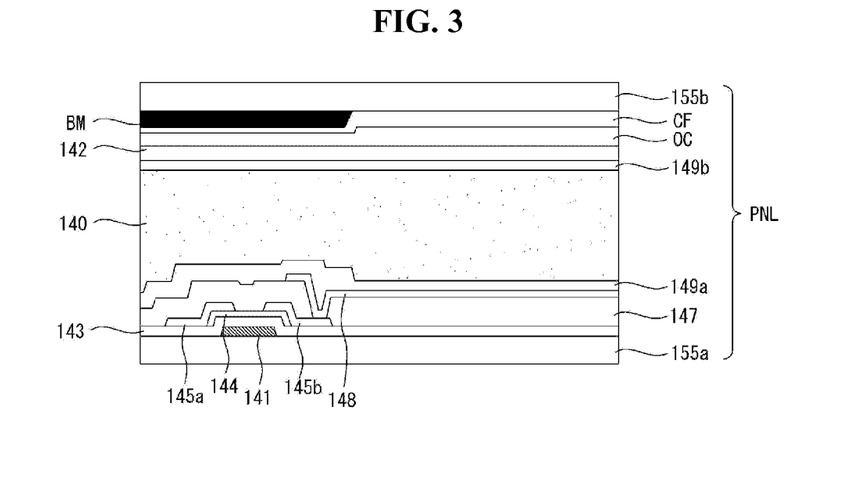
FIG. 3 is an exemplary sectional view of the liquid crystal display panel.

FIG. 3 is an exemplary sectional view of the liquid crystal display panel.

As shown in FIG. 3, a gate electrode 141 is provided on one surface of a TFT substrate 155a. The gate electrode 141 may be formed of a single layer or multi-layers made of any one or an alloy thereof selected from the group consisting of molybdenum (Mo), aluminum (Al), chrome (Cr), gold (Au), titanium (Ti), nickel (Ni), neodymium (Nd), and copper (Cu). A first insulating layer 143 is placed on the gate electrode 141. The first insulating layer 143 may be formed of silicon oxide SiOx, silicon nitride SiNx, or multi-layers thereof, but not limited thereto. An active layer 144, which is disposed on the area corresponding to the gate electrode 141, is placed on the first insulating layer 143. An ohmic contact layer which reduces a contact resistance may be placed on the active layer 144. A source 145a and a drain 145b are placed on the active layer 144. The source 145a and the drain 145b may be formed of a single layer or multi-layers made of any one or an alloy thereof selected from the group consisting of molybdenum (Mo), aluminum (Al), chrome (Cr), gold (Au), titanium (Ti), nickel (Ni), neodymium (Nd), and copper (Cu), but not limited thereto. A second insulating layer 147 is placed on the source 145a and the drain 145b. The second insulating layer 147 may be formed of silicon oxide SiOx, silicon nitride SiNx, or multi-layers thereof, but not limited thereto. A pixel electrode 148 connected to the source 145a or the drain 145b is placed on the second insulating layer 147. The pixel electrode 148 may be made of transparent material such as ITO (indium tin oxide), IZO (indium zinc oxide), ZnO (zinc oxide), or the like, but not limited thereto. A lower alignment layer 149a for setting a pretilt angle of a liquid crystal layer 140 is placed on the second insulating layer 147. A black matrix BM is provided on one surface of the color filter substrate 155b. The black matrix BM is defined as a non-transmissive area (or non-display area). The black matrix BM may be made of photosensitive organic material containing black pigments, and the black pigments may employ carbon black, titanium oxide, or the like, but not limited thereto. A color filter CF is disposed between the neighboring black matrices. The color filter CF may be formed to represent not only red, green, and blue, but also other colors. An overcoating layer OC is placed on the black matrix BM and the color filter CF. The overcoating layer OC may be omitted depending on a structure of the color filter substrate 155b. A common electrode 142 is placed on the overcoating layer OC. The common electrode 142 may be made of transparent material like the pixel electrode, but not limited thereto. An upper alignment layer 149b is placed on the common electrode 142. Spacers are disposed between the TFT substrate 155a and the color filter substrate 155b in order to maintain the cell gap of the liquid crystal layer 140.

Hereinafter, the lens panel according to an embodiment of this document will be described more in detail.

Figure 4:
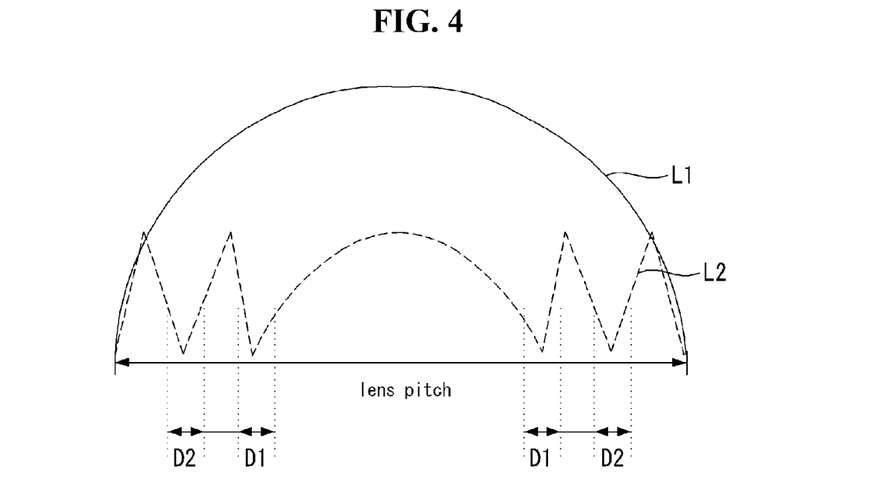
FIG. 4 is a diagram illustrating a lens formed by a liquid crystal layer included in a lens panel according to an embodiment of this document.

FIG. 4 is a diagram illustrating a lens formed by a liquid crystal layer included in the lens panel according to an embodiment of this document.

As shown in FIG. 4, in the lens panel, when the liquid crystal layer is tilted, a Fresnel lens L2 is formed which is constituted by at least three lenses per pitch of unit lens equal to a lenticular lens L1.

In the Fresnel lens L2 shown in the figure, at least five lenses are formed per pitch of unit lens equal to the lenticular lens L1 in order to reduce a height of the lens, and thus at least four surfaces of discontinuities D1 and D2 are present in the boundary surfaces of the lenses. In a lens constituted by at least three lenses per pitch of unit lens, the number of the surfaces of discontinuities is two. In other words, the number of the surfaces of discontinuities D1 and D2 of the Fresnel lens may be different depending on the number of lenses. The Fresnel lens L2 is advantageous in that it achieves the same effect as the lenticular lens L1 (a single lens having a great gap) and has a thickness lower than the lenticular lens L1, thereby reducing the cell gap to make the lens panel thin. Here, the surfaces of discontinuities D1 and D2 may be defined to be formed by liquid crystal molecules positioned at areas lower than other areas when the liquid crystal layer is tilted by the electric filed to form the Fresnel lens L2.

Therefore, the lens panel according to an embodiment of this document has the following structure. A case where the Fresnel lens is constituted by five lenses per pitch of unit lens will be described below as an example.

Figure 5:
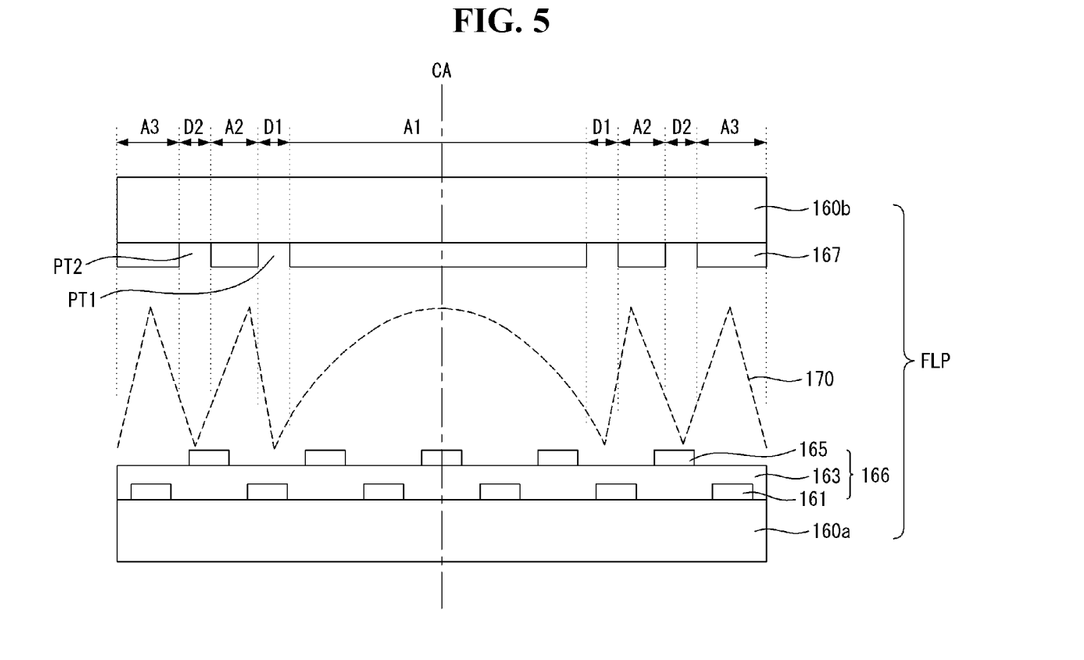
FIG. 5 is a schematic sectional view of a stereoscopic image display device according to an embodiment of this document.
Figure 6:
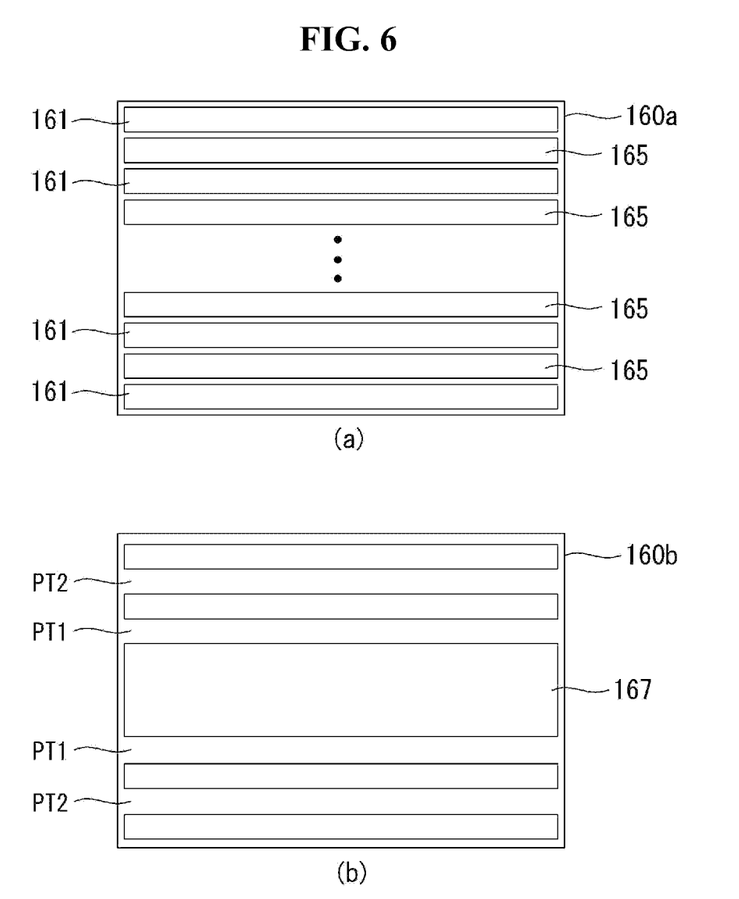
FIG. 6 is a plane view of a lower electrode layer and an upper electrode layer.

FIG. 5 is a schematic sectional view of the stereoscopic image display device according to an embodiment of this document, and FIGS. 6A and 6B are plane views of a lower electrode layer and an upper electrode layer, respectively.

As shown in FIGS. 5 to 6B, the lens panel FLP comprises a lower substrate 160a, a lower electrode layer 166, a liquid crystal layer 170, an upper electrode layer 167, and an upper substrate 160b.

The lower substrate 160a is made of transparent material. The lower electrode layer 166, which has electrodes divided in plurality, is formed on one surface of the lower substrate 160a. The lower electrode layer 166 comprises a first electrode layer 161 having an electrode which is divided in plurality on the lower substrate 160a, an insulating layer 163 placed on the first electrode layer 161, and a second electrode layer 165 having an electrode which is divided in plurality on the insulating layer 163. The divided electrodes of the first and second electrode layers 161 and 163 are, as shown in FIG. 6A, arranged in one direction and alternately positioned not to overlap each other. The first and second electrode layers 161 and 165 are supplied with positive/negative voltages having a predetermined voltage difference with the common voltage supplied to the display panel PNL by the second driver 135. Meanwhile, as shown in the figure, at least one different voltage is supplied to the first and second electrode layers 161 and 165 corresponding to each of left and right areas with respect to a central area CA, such that the liquid crystal layer 170 is tilted in the Fresnel lens form.

The liquid crystal layer 170 is disposed between the lower substrate 160a and the upper substrate 160b. The liquid crystal layer 170 is titled by the electric field generated between the first and second electrode layers 161 and 163 and the upper electrode layer 167. As shown in the figure, in the Fresnel lens formed by the tilted liquid crystal layer 170, there are the surfaces of discontinuities D1 and D2 which are the boundary surfaces of the lenses, between a first area A1 and a second area A2, and between the second area A2 and a third area A3, respectively.

The upper substrate 160b is made of transparent material and is combined to the lower substrate 160a. The upper electrode layer 167 is placed on one surface of the upper substrate 160b and has pattern omissions PT1 and PT2 corresponding to the surfaces of discontinuities D1 and D2 of the Fresnel lens formed by the tilted liquid crystal layer 170. For the pattern omissions PT1 and PT2, at least two pattern omissions are formed per subpixel. Thus, the number of the surfaces of discontinuities D1 and D2 of the Fresnel lens may be at least two per pitch of unit lens, but not limited thereto. In this embodiment, a case where four pattern omissions PT1 and PT2 are formed per subpixel is shown as an example.

The upper electrode layer 167 is positioned in the same direction as the first and second electrode layers 161 and 165 in the state where it is divided as shown in FIG. 6B. Here, the upper electrode layer 167 is formed on the upper substrate 160b so as to correspond to at least transmissive areas of the display panel PNL. The upper electrode layer 167 is supplied with a voltage equal to the common voltage supplied to the display panel PNL by the second driver 135.

As can be seen from the above description, the conditions for the liquid crystal layer 170 to be tilted in the Fresnel lens form include the pattern type of the first and second electrode layers 161 and 165 and the upper electrode layer 167, and the electric field generated therebetween. Therefore, if varying the pattern type of the first and second electrode layers 161 and 165 and the upper electrode layer 167, and the electric field generated therebetween, it is possible to change the Fresnel lens form in various manners.

Figure 7:
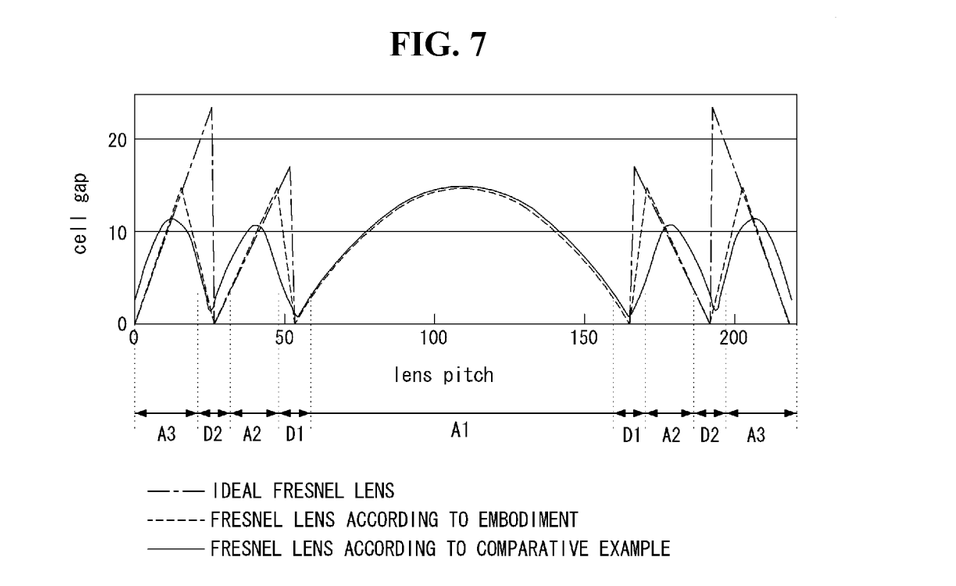
FIG. 7 is a diagram illustrating a Fresnel lens form in accordance with a structure of electrodes formed in the lens panel.
Figure 8:
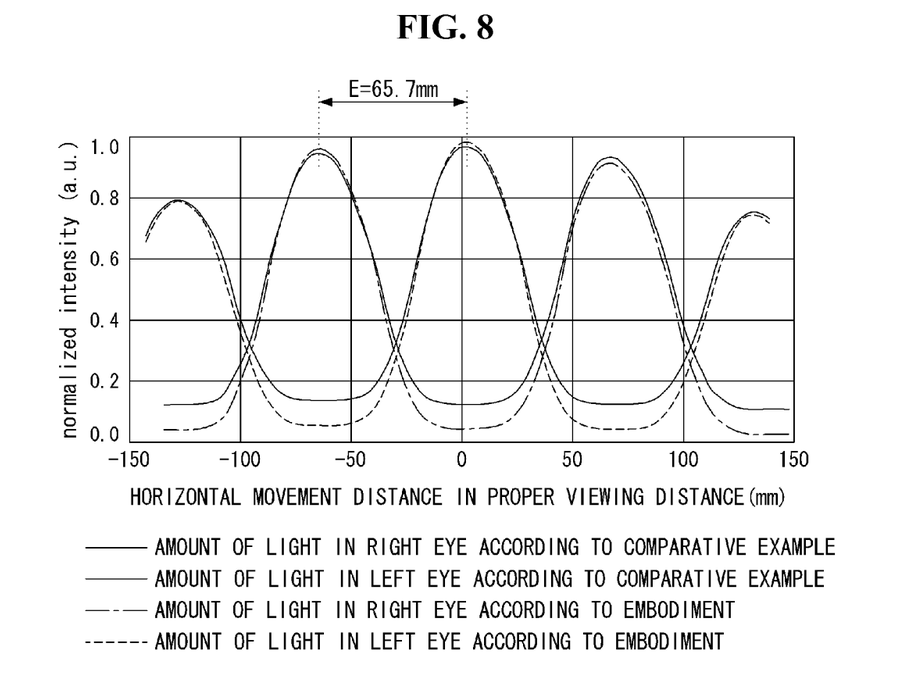
FIG. 8 is a graph illustrating crosstalk improvement ratios between a comparative example and the embodiment.

Hereinafter, there will be description of a Fresnel lens form according to a comparative example and a Fresnel lens form according to the embodiment in accordance with structures of the upper electrode layer of the lens panel, and crosstalk improvement ratios between the Fresnel lens according to the comparative example and the Fresnel lens according to the embodiment FIG. 7 is a diagram illustrating Fresnel lens forms according to structures of electrodes formed in the lens panel, and FIG. 8 is a graph illustrating crosstalk improvement ratios between the comparative example and the embodiment.

As shown in FIG. 7, it can be seen that when the lens panel FLP is formed to have the structure of the electrodes according to the embodiment of this document, the liquid crystal layer 170 is titled to be closer to an ideal Fresnel lens as compared with that in the comparative example.

The following Table 1 shows crosstalk improvement ratios between the Fresnel lens according to the comparative example and the Fresnel lens according to the embodiment.

TABLE 1

|  | Fresnel Lens According to Comparative Example | Fresnel Lens According to Embodiment |
| --- | --- | --- |
| E (distance between two eyes) | 65.7 mm | 65.7 mm |
| Crosstalk (maximum amount of light/minimum amount of light, %) | ~13.00% | ~7.41% |

Referring to Table 1 and FIG. 8, it was confirmed that the Fresnel lens according to the comparative example shows a crosstalk of 13%, whereas the Fresnel lens according to the embodiment shows a crosstalk of 7.4% (a level of 3D crosstalk in a single liquid crystal electric field lens). That is to say, it can be seen that the Fresnel lens according to the embodiment further reduces the crosstalk as compared with the Fresnel lens according to the comparative example.

As above, in the structure of the lens panel FLP according to the embodiment, the pattern omissions PT1 and PT2 where a part of the electrodes in the upper electrode layer 167 is omitted are formed so that the electric fields in the areas corresponding to the surfaces of discontinuities D1 and D2 are floated, and thereby the liquid crystal layer 170 is tilted to be closer to an ideal Fresnel lens.

As described above, according to this document, it is possible to provide the stereoscopic image display device capable of improving the crosstalk between the images for the left eye and the images for the right eye and increasing the image quality of the stereoscopic images. In addition, according to this document, it is possible to provide the stereoscopic image display device capable of reducing the cell gap of the lens panel and showing the stereoscopic image display quality with the level of a single liquid crystal electric field lens, by tilting the liquid crystal layer in the Fresnel lens form.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims.

What is claimed is:

1. A stereoscopic image display device comprising:
a display panel; and
a lens panel disposed on one surface of the display panel, wherein the lens panel includes:
a lower substrate;
a lower electrode layer having electrodes divided in plurality on one surface of the lower substrate;
a liquid crystal layer disposed on the lower electrode layer and tilted in a lens form;
an upper substrate combined to the lower substrate; and
an upper electrode layer disposed on one surface of the upper substrate and having pattern omissions where a part of electrodes is omitted in areas corresponding to a surface of discontinuity of the lens form,
wherein the lower electrode layer comprises:
a first electrode layer having an electrode which is divided in plurality on the lower substrate;
an insulating layer placed on the first electrode layer; and
a second electrode layer having an electrode which is divided in plurality on the insulating layer,
wherein the liquid crystal layer is tilted in a Fresnel lens form, and
wherein the pattern omissions are disposed corresponding to the surface of discontinuity of the Fresnel lens form,
wherein the number of the surface of discontinuity of the Fresnel lens form is at least two per pitch of unit lens,
wherein the upper electrode layer has at least two pattern omissions per subpixel.

2. The stereoscopic image display device of claim 1, wherein areas of the upper electrode layer correspond to at least transmissive areas of the display panel.

3. The stereoscopic image display device of claim 1, wherein the divided electrodes of the first electrode layer and the divided electrodes of the second electrode layer are positioned in one direction.

4. The stereoscopic image display device of claim 1, wherein the divided electrodes of the first electrode layer and the divided electrodes of the second electrode layer are alternately positioned.

5. The stereoscopic image display device of claim 1, wherein the upper electrode layer is supplied with a voltage equal to a common voltage supplied to the display panel.

6. The stereoscopic image display device of claim 1, wherein at least different voltage is supplied to the lower electrode layer corresponding to each of left and right areas with respect to a central area of the lens form.

7. The stereoscopic image display device of claim 1, wherein the display panel comprises a liquid crystal display panel.

8. The stereoscopic image display device of claim 1, wherein the upper electrode layer has at least four pattern omissions per subpixel.

9. A stereoscopic image display device comprising:
a display panel; and
a lens panel disposed on one surface of the display panel, wherein the lens panel includes:
a lower substrate;
a first lower electrode layer having an electrode which is divided in plurality on one surface of the lower substrate;
a second lower electrode layer having an electrode which is divided in plurality on the first electrode layer;
an upper substrate combined to the lower substrate;
an upper electrode layer placed on one surface of the upper substrate and having at least two pattern omissions where a part of electrodes are omitted; and
a liquid crystal layer tilted in a lens form by electric fields generated between the first and second lower electrode layers and the upper electrode layer,
wherein the liquid crystal layer is tilted in a Fresnel lens form having a surface of discontinuity, and
wherein the pattern omissions are disposed corresponding to the surface of discontinuity,
wherein the number of the surface of discontinuity is at least two per pitch of unit lens,
wherein the upper electrode layer has four pattern omissions per subpixel.

10. The stereoscopic image display device of claim 9, wherein the first lower electrode layer and the second lower electrode layer are partitioned by an insulating layer, and
wherein the divided electrodes of the first lower electrode layer and the divided electrodes of the second lower electrode layer are alternately positioned not to overlap each other.

11. The stereoscopic image display device of claim 9, wherein the upper electrode layer is supplied with a voltage equal to a common voltage supplied to the display panel.

12. The stereoscopic image display device of claim 9, wherein at least different voltage is supplied to the first and second lower electrode layers corresponding to each of left and right areas with respect to a central area of the lens form.

* * * * *